United States Patent
Yang et al.

(10) Patent No.: US 8,664,584 B2
(45) Date of Patent: Mar. 4, 2014

(54) COMPACT TAP MONITOR WITH A REFLECTION MASK

(75) Inventors: Yatao Yang, Plano, TX (US); Chang Xiao, Shenzhen (CN); Yujian Bao, Shenzhen (CN); Fenhong Zhou, Shenzhen (CN)

(73) Assignee: JDS Uniphase Corporation, Milpitas, CA (US)

( * ) Notice: Subject to any disclaimer, the term of this patent is extended or adjusted under 35 U.S.C. 154(b) by 711 days.

(21) Appl. No.: 12/905,478

(22) Filed: Oct. 15, 2010

(65) Prior Publication Data

US 2011/0089314 A1 Apr. 21, 2011

Related U.S. Application Data

(60) Provisional application No. 61/251,981, filed on Oct. 15, 2009.

(51) Int. Cl.
*G01J 1/04* (2006.01)
*H01J 3/14* (2006.01)
*G02B 6/26* (2006.01)
*G02B 6/36* (2006.01)

(52) U.S. Cl.
USPC ........... 250/227.11; 250/216; 385/31; 385/88

(58) Field of Classification Search
USPC .............. 250/216, 227.11, 227.2, 227.21, 250/227.24, 214.1, 239; 385/16, 18, 24, 385/31–34, 39, 48, 73, 74, 88, 89, 92, 93
See application file for complete search history.

(56) References Cited

U.S. PATENT DOCUMENTS

| | | | | |
|---|---|---|---|---|
| 6,389,188 B1 * | 5/2002 | Scobey et al. | | 385/18 |
| 6,782,153 B2 * | 8/2004 | Polinsky et al. | | 385/16 |
| 6,895,144 B2 * | 5/2005 | Shi | | 385/33 |
| 7,333,693 B2 | 2/2008 | Nagata et al. | | 385/48 |
| 2003/0210874 A1 * | 11/2003 | Souda et al. | | 385/89 |
| 2004/0156596 A1 * | 8/2004 | Parsons et al. | | 385/88 |
| 2007/0036491 A1 * | 2/2007 | Suzuki et al. | | 385/89 |

\* cited by examiner

*Primary Examiner* — Pascal M Bui Pho
(74) *Attorney, Agent, or Firm* — Matthew A. Pequignot; Pequignot + Myers LLC

(57) ABSTRACT

A compact PD unidirectivity solution for an optical tap monitor, which reduces the overall size of optical tap module, is provided. The solution is to use lensing to separate the light from the input and output fibers, and then add a mask or spacer in front of the monitor PD to prevent any of the light from the output fiber from entering the photodetector package.

10 Claims, 4 Drawing Sheets

COMPACT TAP MONITOR WITH A REFLECTION MASK

CROSS-REFERENCE TO RELATED APPLICATIONS

The present invention claims priority from U.S. Patent Application No. 61/251,981 filed Oct. 15, 2009, which is incorporated herein by reference for all purposes.

TECHNICAL FIELD

The present invention relates to a compact optical tap monitor, and in particular to an optical tap monitor including a uni-directivity solution preventing superfluous light from entering the photodetector housing for increasing the accuracy of the photodetector measurement.

BACKGROUND OF THE INVENTION

With reference to FIG. 1, a conventional integrated optical tap monitor 10 in accordance with the present invention includes two waveguides, an input fiber 1 and an output fiber 2, a collimating lens combination 3, a tap filter or tap coating 4, an imaging lenses combination 6, and one photodetecter (PD) package 8, including a PD chip 9.

Light, launched from the input fiber 1, is collimated by the lens combination 3, and directed onto the tap filter or coating 4. A first portion of the collimated beam is reflected by the tap filter or coating 4 to the lens combination 3, which focuses the first portion into the output fiber 2. A second portion of the collimated beam is focused by the imaging lens combination 6 onto the PD chip 9 to monitor the output light power of the input beam.

Unfortunately, any light launched or back reflected from the output fiber 2 will also be focused onto the PD chip 9, providing incorrect measurements of the power of the light portion coming from the input fiber 1.

An attempt at improving the conventional optical tap module is disclosed in U.S. Pat. No. 7,333,693, issued Feb. 19, 2008 to Nagata et al, in which light from the input fiber and light from the output fiber are directed in slightly different directions by an imaging lens. Unfortunately, unwanted reflected light will still enter the packaged photodetector 8, resulting in overly high power readings by the photodetector chip 9 due to multiple reflections off the walls of the photodetector package 8.

An object of the present invention is to overcome the shortcomings of the prior art by providing a lensing arrangement, which separates the light coming from the input fiber and the output fiber, and a mask for preventing any of the light from the output fiber from entering the photodetector package.

SUMMARY OF THE INVENTION

Accordingly, the present invention relates to a compact optical tap monitor device comprising:

an input waveguide for launching an optical signal;
a collimating lens for collimating the optical signal;
a tap filter for receiving the collimated optical signal at an acute angle of incidence, for reflecting a first portion of the optical signal at an acute angle of reflection, and for passing a second portion of the optical signal;
an output waveguide spatially separated from the input waveguide for outputting the first portion of the optical signal;
an imaging lens for focusing the second portion of the optical signal, and for spatially separating light from the input waveguide from light from the output waveguide;
a photodetector including an active area for receiving the second portion of the optical signal and for providing a measure of the optical power in the second portion;
a mask covering a portion of the active area blocking light from the output waveguide from the active area of the photodetector.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
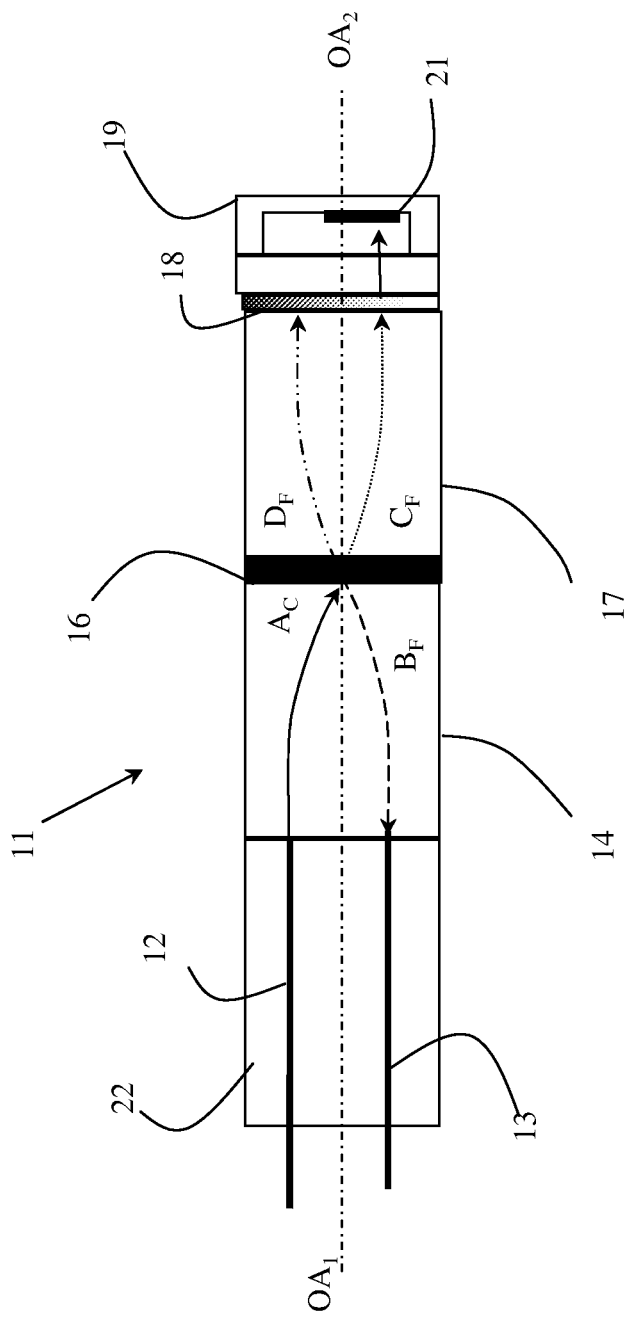
FIG. 2 illustrates a cross-sectional view of an optical tap monitor in accordance with the present invention.

With reference to FIG. 2, an integrated optical tap monitor 11 in accordance with the present invention includes two waveguides, an input fiber 12 and an output fiber 13, a collimating lens combination, e.g. graded index lens 14, a tap filter or tap coating 16, an imaging lenses combination, e.g. graded index lens 17, a mask or spacer 18, and one monitor photodetecter (PD) package 19, including a photodetector (PD) 21. Any waveguide or any light transmission medium can be used in place of the input and output fibers 1 and 2.

Light, launched from the input fiber 1, is collimated by the lens combination 14 forming collimated light $A_C$, and directed onto the tap filter or coating 16. A first portion $B_F$ of the collimated beam $A_C$ is reflected by the tap filter or coating 16 at an acute angle of reflection in the lens combination 14, which focuses the first portion $B_F$ into the output fiber 13. A second smaller (1% to 10%) portion $C_F$ of the collimated beam $A_C$ is focused by the imaging lens combination 17 through a clear portion of the mask 18 into the PD package 19 and onto the PD 21 to monitor the output light power of the input beam A. Ideally, the optical axes $OA_1$ of the collimating lens 14 and the optical axis $OA_2$ of the imaging lens 17 are aligned colinear with each other, with the input fiber 12 spaced the same distance therefrom as the output fiber 13. Any light $D_F$ launched r reflected from the output fiber 13, which passes through the tap filter 16 is directed to a masked portion of the mask 18, which prevents the light $D_F$ from entering into the PD package 19 and from onto the photodetector 21.

Due to the symmetry of the input and output fibers 12 and 13 and the collimating and imaging lenses 14 and 17, the tapped portion $C_F$ of the input light A is directed to one side of the optical axes $OA_1$ and $OA_2$ of the lenses 14 and 17, while the superfluous light $D_F$ is directed to the opposite side of the optical axes $OA_1$ and $OA_2$. Accordingly, the photodetector 21 is preferably positioned on the one side of the optical axes $OA_1$ and $OA_2$, while the masked portion of the mask 18 is positioned on the opposite side of the optical axes $OA_1$ and $OA_2$. Other arrangements, in which symmetry between the input and output fibers 12 and 13, and the lenses 14 and 17 are also possible.

The separated distance between the focused light $C_F$ and the superfluous light $D_F$ exiting the lens 17 depends on the distance between the input and output fibers 12 and 13, and the combination of the focal lengths of the collimating lens 14 with the focusing lens 17. Unfortunately, without the mask 18, unwanted reflected light will still enter the packaged photodetector 19, resulting in overly high power readings by the photodetector 21.

Figure 1:
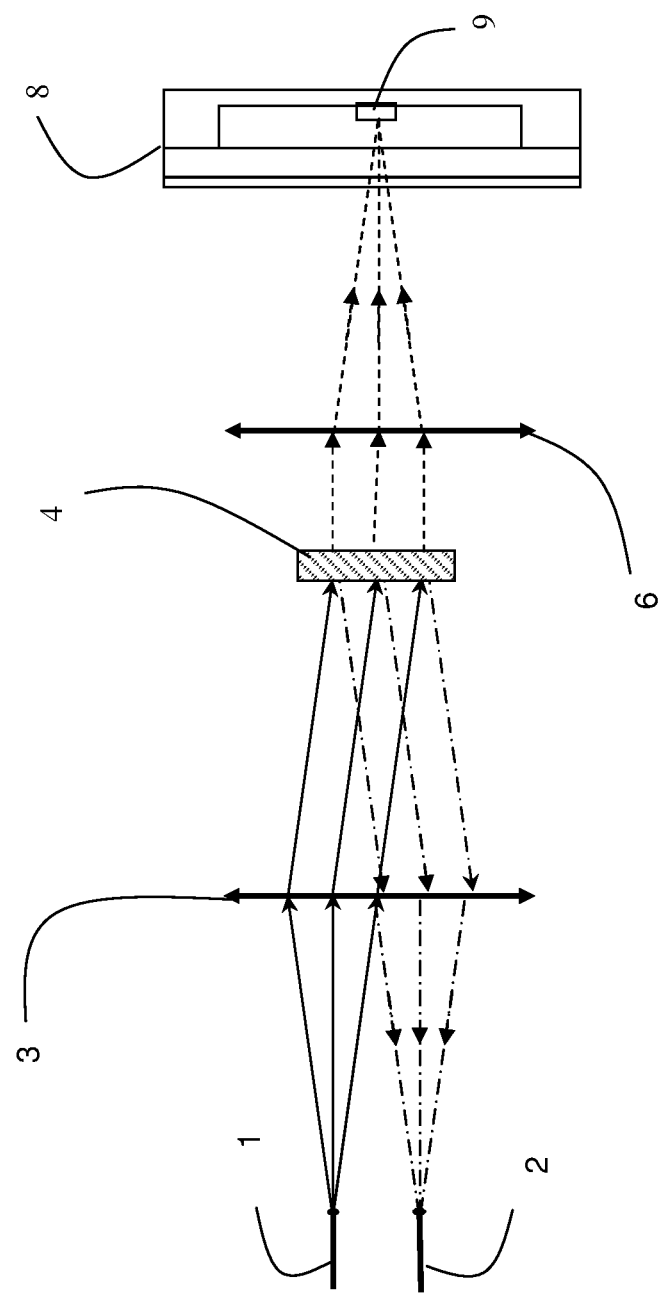
FIG. 1 illustrates a conventional optical tap monitor.

The typical structure of an integrated PD monitor is illustrated in FIG. 1; however, the monitor PD 11 with mask or spacer 18 can be reduced in size, and a packaged PD 19 can be connected to the lens 17 directly, so the whole assembly size becomes very compact integrated unit, as illustrated in FIG. 2. A dual fiber pigtail 22, containing both the input and output fibers 12 and 13, can be connected together, e.g. fixed with adhesive, with the collimating lens 14, and the imaging lens 17 with the tap filter 16 coated on either one of the collimating lens 14 or the imaging lens 17 or on a separate substrate therebetween. An example of the size of the packaged PD 11 with mask or spacer 18 is <1.8 mm×1.8 mm×1.2 mm.

The shape and design of the monitor PD package 19 is not essential, and depends on the structure of the overall assembly. The uni-directivity refers to light coming from one direction having much more power than light coming from another direction, e.g. when light is launched from the input fiber 12, the photodetector 21 has a normal response $I_1$, but when light is launched from the output fiber 13, the photodetector 21 has a much lower response $I_2$. Typical requirements call for $-10*\log(I_2/I_1)>15$ dB or more.

Below is a chart of experimental results for the PD package 19 in accordance with the present invention indicating directivity above 19 dB in all cases.

| | | Photocurrent of PD 11 | | |
|---|---|---|---|---|
| Number | Input Power | Incident from input fiber 1 | Incident from output fiber 2 | Directivity (dB) |
| 1 | 4 mW | 40 μA | 0.1 μA | 26.0 |
| 2 | 4 mW | 38 μA | 0.4 μA | 19.8 |
| 3 | 4 mW | 42 μA | 0.1 μA | 26.2 |
| 4 | 4 mW | 34.5 μA | 0.3 μA | 20.6 |
| 5 | 4 mW | 46.5 μA | 0.3 μA | 21.9 |

Figure 3:
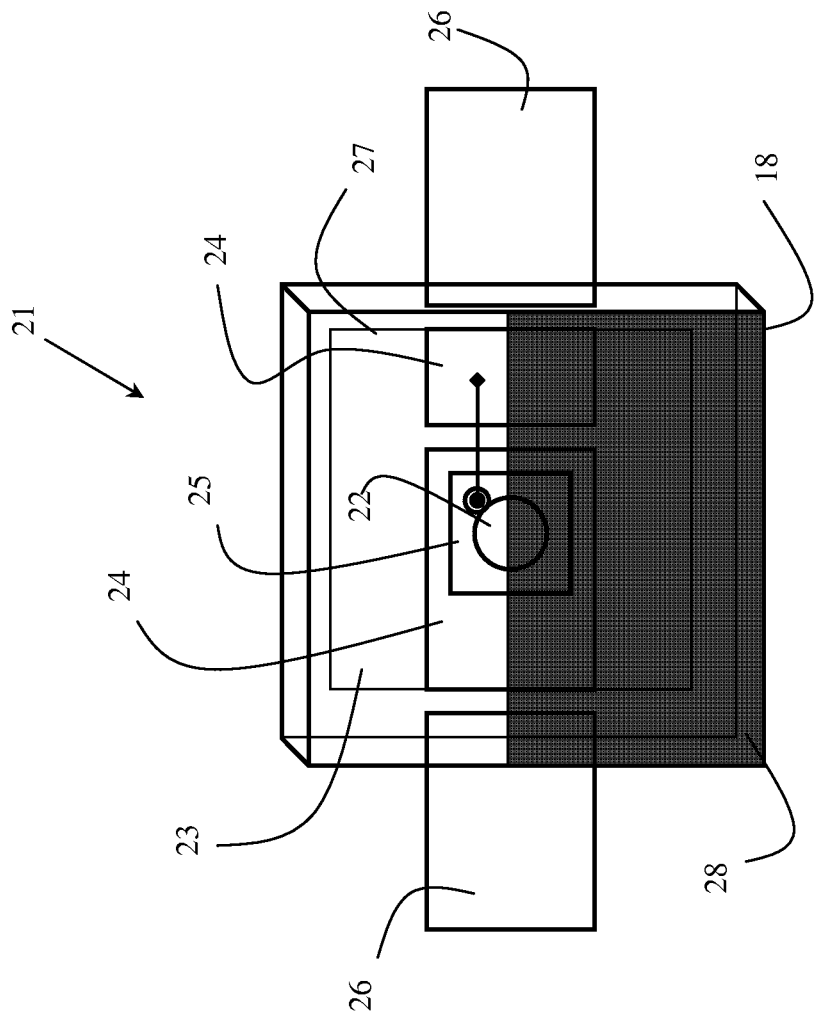
FIG. 3 illustrates a photodetector package of the optical tap monitor of FIG. 2.

With reference to FIG. 3, a typical packaged photodetector 21 includes a photodetector chip 25 with an active area 22 mounted on a substrate 23. Solder pads 24 are provided on the substrate 23 for electrically connecting the photodetector chip 25 with electrical leads 26 extending from opposite sides of the photodetector 21. A transparent, e.g. clear glass, window 27 is placed over the photodetector chip 25 to protect it from elements in the environment.

Figure 4:
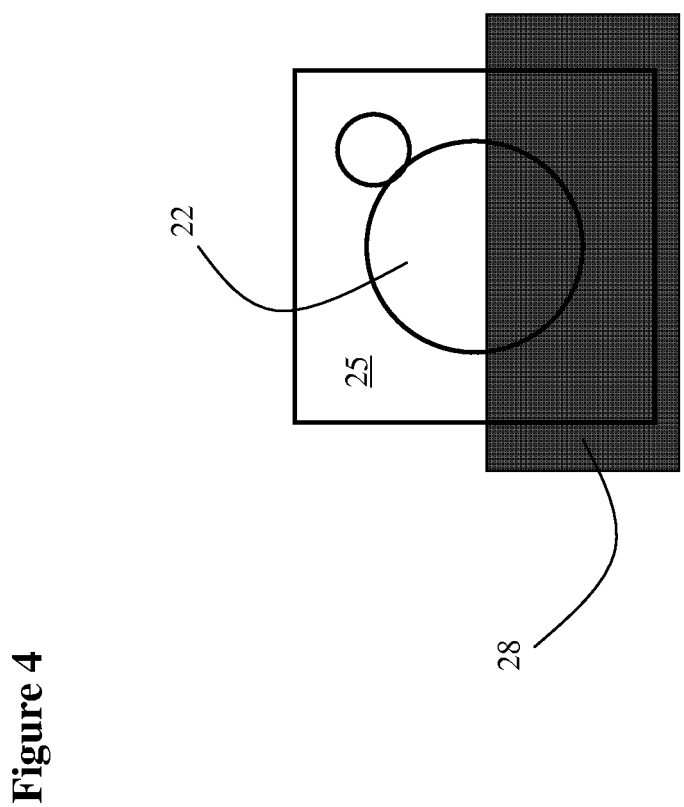
FIG. 4 illustrates an alternative embodiment of the mask of the photodetector package of FIG. 2.

Using the mask or spacer 18 prevents the reflected light from the output fiber 13 from entering the photodetector package 19 and being detected by the PD chip 25. The mask portion 28 can be rectangular in shape, thereby having a straight edge parallel to the edge of the window 27, covering a fraction of the opening of the photodetector package 19 and the active area 22 on the side of the photodetector package 19 to where the reflected light $D_F$ is directed by the lens 17, as shown in FIG. 2. The exact shape of the mask portion 28 is not essential; however, it ideally covers ⅓~⅔, preferably 0.4 to 0.6, of the PD active area 22 based on the imaging points spacing distance and direction of the reflected light to the PD chip 25, as illustrated in FIG. 4, for intersecting the reflected light and preventing it from becoming incident on the active area 22 of the PD chip 25. The masked portion 28 can be placed on or over the glass window 27, as illustrated in FIG. 3 or disposed inside the glass window 27 directly on or over the PD chip 25 covering a portion of the active area 22 where the reflected light would enter, as illustrated in FIG. 4, thereby preventing the PD chip 25 from measuring the reflected light.

The mask portion 28 can be made out or any suitable material, e.g. metal, plastic, epoxy, glue or any shading light material. Optically absorbing or reflecting coatings can also be used.

We claim:

1. A compact optical tap monitor device comprising:
    an input waveguide for launching an optical signal;
    a collimating lens for collimating the optical signal;
    a tap filter for receiving the collimated optical signal at an acute angle of incidence, for reflecting a first portion of the optical signal at an acute angle of reflection, and for passing a second portion of the optical signal;
    an output waveguide spatially separated from the input waveguide for outputting the first portion of the optical signal;
    a photodetector including an active area for receiving the second portion of the optical signal and for providing a measure of the optical power in the second portion;
    an imaging lens for focusing the second portion of the optical signal onto the active area of the photodetector, and for spatially separating the second portion of the optical signal from light from the output waveguide; and
    a mask covering a portion of the active area passing the second portion of the optical signal to the photodetector, and blocking light from the output waveguide from the active area of the photodetector;
    wherein the collimating lens is defined by an optical axis;
    wherein the second portion of the optical signal is directed by the collimating lens to one side of the optical axis, and the light from the output fiber is directed by the collimating lens to the opposite side of the optical axis; and
    wherein the mask is positioned on the opposite side of the optical axis preventing the light from the output waveguide from entering the photodetector.

2. The device according to claim 1, wherein the photodetector includes a glass window covering a photodetector chip, and wherein the mask is mounted on the glass window.

3. The device according to claim 1, wherein the photodetector includes a photodetector chip; and wherein the mask is mounted directly on the photodetector chip.

4. The device according to claim 1, wherein the mask comprises a material selected from the group consisting of metal, plastic, epoxy, and glue.

5. The device according to claim 1, wherein the mask comprises a light absorbing or reflecting coating material.

6. The device according to claim 1, wherein the mask covers ⅓ to ⅔ of the active area of the photodetector.

7. The device according to claim 1, wherein the input waveguide and the output waveguide are equidistant from the optical axis.

8. The device according to claim 1, wherein the collimating lens and the imaging lens are connected together with the tap filter therebetween; and wherein the mask and photodetector are mounted on an end of the imaging lens forming a single integral unit.

9. The device according to claim 1, wherein the photodetector is positioned on the one side of the optical axis.

10. The device according to claim 1, wherein the mask comprises a light absorbing material.

* * * * *